(12) United States Patent
Chen et al.

(10) Patent No.: US 11,037,307 B2
(45) Date of Patent: Jun. 15, 2021

(54) METHOD AND ELECTRONIC APPARATUS FOR COMPARING TRACKING OBJECT

(71) Applicant: Institute For Information Industry, Taipei (TW)

(72) Inventors: Bo-Chih Chen, Kaohsiung (TW); Kai-Pin Tung, Taipei (TW)

(73) Assignee: Institute For Information Industry, Taipei (TW)

(*) Notice: Subject to any disclaimer, the term of this patent is extended or adjusted under 35 U.S.C. 154(b) by 182 days.

(21) Appl. No.: 16/249,880

(22) Filed: Jan. 16, 2019

(65) Prior Publication Data
US 2020/0043180 A1 Feb. 6, 2020

(30) Foreign Application Priority Data
Aug. 6, 2018 (TW) .................. 107127292

(51) Int. Cl.
*G06T 7/246* (2017.01)
*G06T 7/13* (2017.01)
(Continued)

(52) U.S. Cl.
CPC .............. *G06T 7/248* (2017.01); *G06K 9/40* (2013.01); *G06K 9/6202* (2013.01); *G06K 9/6215* (2013.01); *G06T 7/13* (2017.01); *G06T 7/74* (2017.01); *G06T 2207/10024* (2013.01); *G06T 2207/20021* (2013.01)

(58) Field of Classification Search
CPC .. G06T 7/13; G06T 7/74; G06T 7/248; G06T 2207/10016; G06T 2207/10024; G06T 7/246; G06T 2207/20021; G06K 9/4604; G06K 9/6202; G06K 9/6215; G06K 9/40
See application file for complete search history.

(56) References Cited

U.S. PATENT DOCUMENTS 7,227,893 B1 * 6/2007 Srinivasa ........... G06K 9/00771
 348/155
8,345,102 B2 1/2013 Huang et al.
(Continued)

FOREIGN PATENT DOCUMENTS

CN 103780871 A 5/2014
TW I274296 B 2/2007
(Continued)

*Primary Examiner* — Margaret G Mastrodonato
(74) *Attorney, Agent, or Firm* — Skaar Ulbrich Macari, P.A.

(57) ABSTRACT

A method and an electronic apparatus for comparing tracking object are provided. The method applies an edge detection to a template image and a candidate image to generate a template edge image and a candidate edge image respectively. A vertical template edge image and a horizontal edge template image caused by summing (or averaging) the pixel values of the template image horizontally and vertically are used to compare with the summing (or averaging) pixel values of the horizontal/vertical candidate edge images. A measurement in the comparison is based on the positions of partial horizontal candidate edge image and the partial vertical candidate edge image. The method determines that a region of the candidate image has the tracking object according to the vertical coordinate information and the horizontal coordinate information.

20 Claims, 8 Drawing Sheets

(51) Int. Cl.
    *G06T 7/73*     (2017.01)
    *G06K 9/62*     (2006.01)
    *G06K 9/40*     (2006.01)

(56) References Cited

U.S. PATENT DOCUMENTS

| | | |
|---|---|---|
| 2010/0124358 A1 | 5/2010 | Huang et al. |
| 2011/0069891 A1* | 3/2011 | Hou .......................... G06T 7/13 382/199 |
| 2012/0039508 A1* | 2/2012 | Cao ................... G06K 9/00785 382/103 |
| 2014/0200759 A1* | 7/2014 | Lu .......................... B60D 1/245 701/28 |
| 2015/0261322 A1 | 9/2015 | Lye |
| 2016/0267675 A1* | 9/2016 | Du ............................ G06T 7/13 |
| 2018/0068431 A1* | 3/2018 | Takeda ...................... G06T 7/11 |

FOREIGN PATENT DOCUMENTS

| | | |
|---|---|---|
| TW | I371720 B | 9/2012 |
| TW | I382762 B1 | 1/2013 |
| TW | I520009 B | 2/2016 |

\* cited by examiner

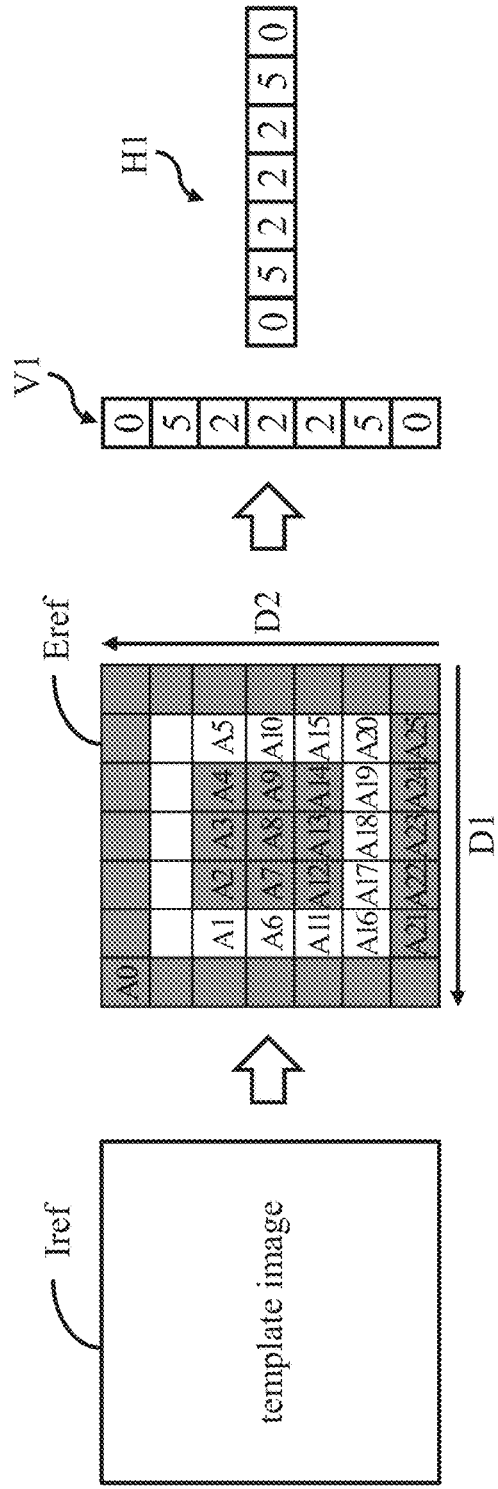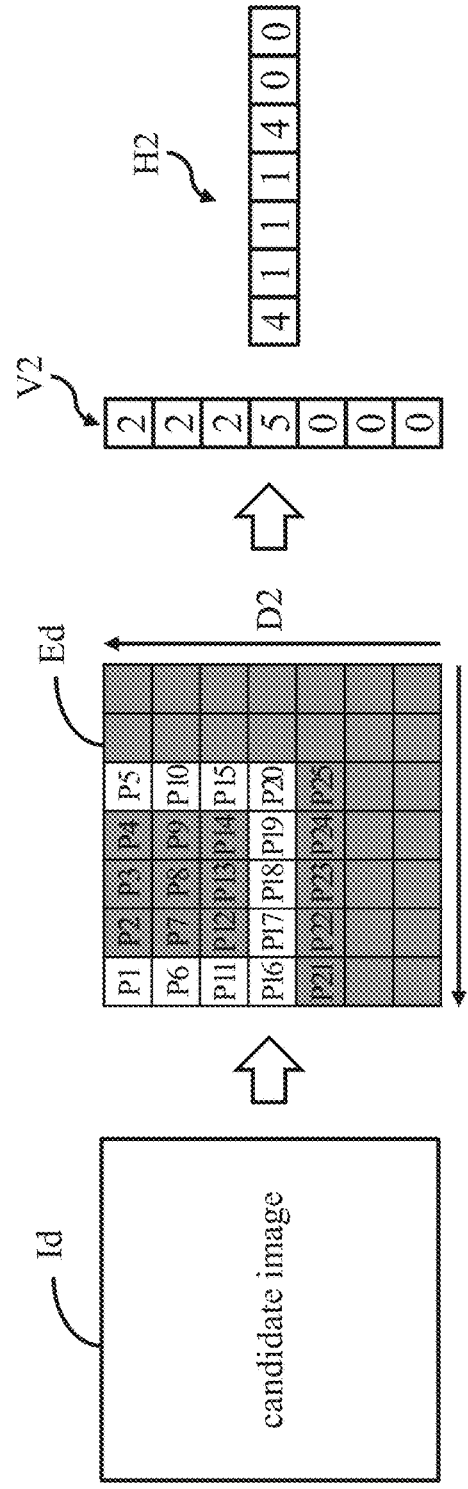

METHOD AND ELECTRONIC APPARATUS FOR COMPARING TRACKING OBJECT

PRIORITY

This application claims priority to Taiwan Patent Application No. 107127292 filed on Aug. 6, 2018, which is hereby incorporated by reference in its entirety.

FIELD

Embodiments of the present disclosure relate to a method and an electronic apparatus. More particularly, embodiments of the present disclosure relate to a method and an electronic apparatus that quickly compares the tracking object by utilizing the edge image information and the template matching technique.

BACKGROUND

Object tracking technology has become more and more important as automated human-computer interaction interface becomes the design trend. Some conventional object tracking techniques use a two-dimensional cross-correlation search method, which tracks objects by evaluating the correlation between the template image and the original image on a pixel-by-pixel base. Some other conventional object tracking techniques use the block correlation scheme, which calculates the correlation between the template image and the original image within a specific correlation window, and obtains a maximum correlation coefficient to track objects.

How to quickly and accurately track objects is an important issue. Previous methods have provided a useful tracking algorithms for maintain tracking speed (i.e., quickly track down objects) and ensuring the accuracy of tracking (i.e., objects are indeed tracked), but it is time consuming to determine if the target being tracked is indeed the object to be tracked. When the tracking speed is increasing, it may cause that the object cannot be accurately tracked and, furthermore, whether the currently tracked object is indeed the object to be tracked cannot be accurately determined.

Therefore, it is still need a method that can quickly track objects and quickly determine whether the objects to be tracked has been successfully tracked in image processing.

SUMMARY

To achieve the aforesaid goals, provided is a method for comparing tracking object, which is suitable for an electronic apparatus. The method can include: (A) applying an edge detection to a template image to generate a template edge image, wherein the template image has an object; (B) applying the edge detection to a candidate image to generate a candidate edge image; (C) calculating a plurality of pixel values of the template edge image in a horizontal direction and in a vertical direction to generate a vertical template image and a horizontal template image respectively; (D) calculating a plurality of pixel values of the candidate edge image in the horizontal direction and in the vertical direction to generate a vertical candidate image and a horizontal candidate image respectively; (E) position-matching at least one partial horizontal candidate image of the horizontal candidate image with the horizontal template image to determine a horizontal coordinate information; (F) position-matching at least one partial vertical candidate image of the vertical candidate image with the vertical template image to determine a vertical coordinate information; and (G) determining that a region of the candidate image has the object according to the horizontal coordinate information and the vertical coordinate information.

Also provided is an electronic apparatus for comparing tracking object, which includes a storage and a processor. The storage stores a template image and a candidate image, wherein the template image has an object. The processor is coupled to the storage and can be configured to execute the following steps of: (A) applying an edge detection to the template image to generate a template edge image; (B) applying the edge detection to the candidate image to generate a candidate edge image; (C) calculating a plurality of pixel values of the template edge image in a horizontal direction and in a vertical direction to generate a vertical template image and a horizontal template image respectively; (D) calculating a plurality of pixel values of the candidate edge image in the horizontal direction and in the vertical direction to generate a vertical candidate image and a horizontal candidate image respectively; (E) position-matching at least one partial horizontal candidate image of the horizontal candidate image with the horizontal template image to determine a horizontal coordinate information; (F) position-matching at least one partial vertical candidate image of the vertical candidate image with the vertical template image to determine a vertical coordinate information; and (G) determining that a region of the candidate image has the object according to the horizontal coordinate information and the vertical coordinate information In summary, a method and an electronic apparatus for comparing tracking object are provided, which adapt an edge image of the template image and that of the candidate image (i.e. the template edge image and the candidate edge image), reduce the amount of data in the edge image, and determine whether the object to be tracked in the template image is successfully tracked according to the edge images whose amount of data have been reduced. In this way, the method and the electronic apparatus for comparing tracking object can quickly track the object while ensuring the tracking accuracy.

What described above is not intended to limit the present invention, but only generally describes the technical problem that can be solved by the present invention, the technical means that can be adopted and the technical effect that can be achieved so that a person having ordinary skill in the art can preliminarily understand the present invention. Details of the embodiments of the present invention can be further understood by a person having ordinary skill in the art according to attached drawings and contents recorded in the following description of the preferred embodiments.

BRIEF DESCRIPTION OF THE DRAWINGS

The present disclosure shall be more fully understood from the following detailed description and drawings. However, it should be understood that the drawings are provided by way of illustration only and are not intended to limit the invention, wherein:

FIG. 4A illustrates a schematic view of generating the vertical template image and the horizontal template image according to an embodiment of the present disclosure;

FIG. 4B illustrates a schematic view of generating the vertical candidate image and the horizontal candidate image according to an embodiment of the present disclosure;

DETAILED DESCRIPTION

The present invention will be explained by referring to the exemplary embodiments thereof. However, the embodiments described below are not intended to limit the present invention to any environment, applications, structures, processes, embodiments, examples or steps described in these embodiments. Therefore, the description of these exemplary embodiments is only intended to be illustrative instead of limiting, and the scope of the invention is to be determined by the claims.

It should be appreciated that in the attached drawings, elements unrelated to the present invention are omitted from depiction; and dimensions of elements and proportional relationships among individual elements in the attached drawings are only examples but not intended to limit the present invention.

The method and the electronic apparatus for comparing tacking object disclosed herein generate edge images of the template image and the candidate image (i.e. the template edge image and the candidate edge image), reduce the amount of data of the template edge image according to a horizontal direction and a vertical direction to generate vertical template image and horizontal template image, and reduce the amount of data of the candidate edge image according to the horizontal direction and the vertical direction to generate vertical candidate image and horizontal candidate image. The method and the electronic apparatus then position-matching parts of the horizontal candidate image with the horizontal template image to determine a horizontal coordinate information, and position-matching parts of the vertical candidate image with the vertical template image to determine a vertical coordinate information. Afterwards, the method and the electronic apparatus determine whether the object to be tracked in the template image is successfully tracked in the candidate image according to the horizontal coordinate information and the vertical coordinate information.

In addition, the method and the electronic apparatus can improve the accuracy of determining whether the object to be tracked in the template image is successfully tracked in the candidate image by utilizing the image similarity degree between the partial template image and the partial candidate image, even by utilizing the color similarity degree between the partial template image and the partial candidate image. Therefore, the method and the electronic apparatus of the present disclosure can quickly make a determination while ensuring the tracking accuracy. The method and the electronic apparatus for comparing tracking object of the present disclosure will be described in the following paragraphs.

Figure 1:
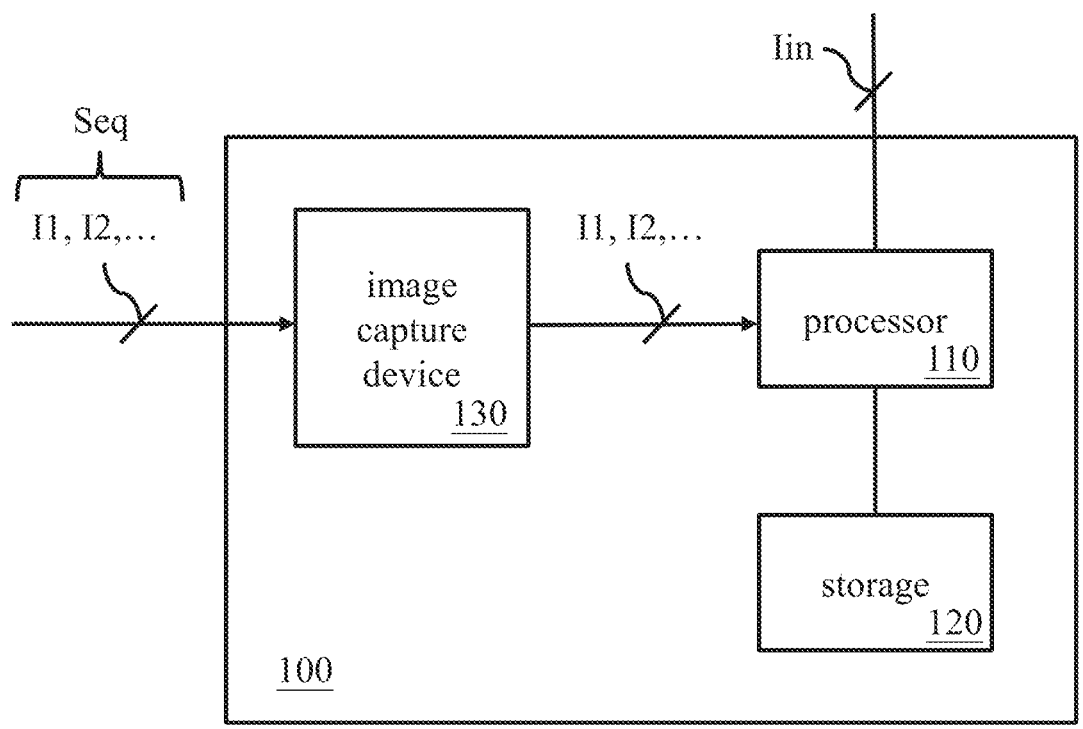
FIG. 1 illustrates a schematic view of an electronic apparatus for comparing tracking object according to an embodiment of the present disclosure.

First, please refer to FIG. 1, which illustrates a schematic view of an electronic apparatus 100 for comparing tracking object according to an embodiment of the present disclosure. As shown in FIG. 1, the electronic apparatus 100 is configured to track an object in an image sequence and to continuously determine whether the object in the image sequence has been tracked successfully. In the present disclosure, the electronic apparatus 100 may be a smartphone, a laptop, a head-mounted electronic apparatus, or other electronic apparatus being able to perform image tracking techniques, which is not limited by the present disclosure.

The electronic apparatus 100 comprises a processor 110, a storage 120, and an image capture device 130. The processor 110 is coupled to the storage 120 and the image capture device 130. The storage 120 may be a memory, a Universal Serial Bus (USB), a hard drive, a compact disk (CD), a flash drive or any other non-transitory storage medium, or device having the same function for storing digital data known to people having ordinary skill in the art. The processor 110 may be any processor, central processing unit (CPU), microprocessor unit (MPU), digital signal processor (DSP), or any other computing device having the same function known to people having ordinary skill in the art. The image capture device 130 may be any device capable of capturing a picture and generating a digital image.

In this embodiment, the image capture device 130 generates an image sequence Seq and transmits the image sequence Seq to the processor 110, which will be used by the processor 110 when performing the following method for comparing tracking object. Note that in some other embodiments, the electronic apparatus 100 does not have the image capture device 130 and receives the image sequence Seq via a receiving interface instead.

In the present embodiment, the processor 110 crops a template image from a first image I1 in the image sequence Seq according to a tracking frame (not shown in FIGs). Furthermore, the processor 110 receives a signal Iin from a remote device (not shown in FIGs), for instance, receiving the signal Iin via a receiving interface (not shown in FIGs) included in the electronic apparatus 100. The signal Iin includes the position of the tracking frame in the first image I1, and the tracking frame corresponds to the object to be tracked (e.g., the object to be tracked appears in the tracking frame). Note that in some embodiments, the storage 120 may store the template image in advance and, therefore, the processor 110 do not have to crop the template image from the first image I1 according to the tracking frame.

Figure 2:
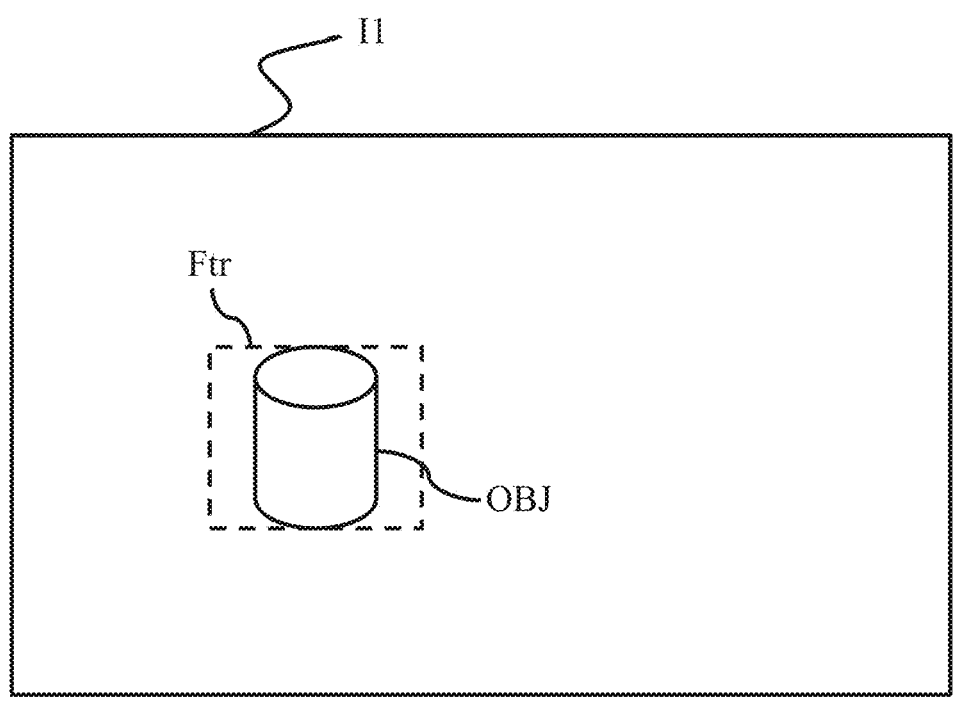
FIG. 2 illustrates a schematic view of the tracking frame in the first image according to an embodiment of the present disclosure.

For ease of understanding, please refer to FIG. 2 together. In the present embodiments, the remote device displays the first image I1, and a remote operator selects the object OBJ to be tracked according to the displayed first image I1 to generate the tracking frame Ftr correspondingly. Subsequently, the remote device transmits the signal Iin to the processor 110. The signal Iin has the position of the tracking frame Ftr in the first image I1. The processor 110 of the electronic apparatus 100 will then crop the template image with the object OBJ to be tracked from the first image I1 for subsequent comparison according to the position of the tracking frame Ftr. In other embodiments, the processor 110 is coupled to a display device (not shown in FIGs). The display device displays the first image I1. The operator may select the object OBJ to be tracked according to the displayed first image I1 to generate the tracking frame Ftr correspondingly. The processor 110 then crops the template image with the object OBJ to be tracked from the first image I1 for subsequent comparison according to the position of the tracking frame Ftr.

Next, the processor 110 estimates a relative position of the object OBJ to be tracked in a second image I2 of the image sequence Seq according to the template image and a tracking algorithm. The processor then crops a candidate image from the second image I2 according to the aforementioned relative position. That is to say, the tracking algorithm estimates that the object OBJ to be tracked is in the candidate image. The processor 110 will determine whether the object OBJ to be tracked is indeed in the candidate image through subsequent operations. Note that the tracking algorithm in the present disclosure is not limited to any specific tracking algorithm, and the implementation of the tracking algorithm shall be well-known to people having ordinary skill in the art. For instance, the tracking algorithm may be the Kernel Correlation Filter (KCF) algorithm and the Consensus-based Matching and Tracking of Keypoints for Object Tracking (CMT) algorithm, and thus will not be further described herein. Also note that the relationship between the size of the candidate image and the size of the template image is not limited in the present disclosure, that is, the size of the candidate image and the size of the template image may be the same or different.

It should be noted that, in this embodiment, the first image I1 represents the first image in the image sequence Seq and the second image I2 represents the second image in the image sequence Seq. In other embodiments, the first image I1 is a specific image in the image sequence Seq and the second image I2 is another image after the specific image in the image sequence Seq. The present disclosure is not limited thereto.

Figure 3:
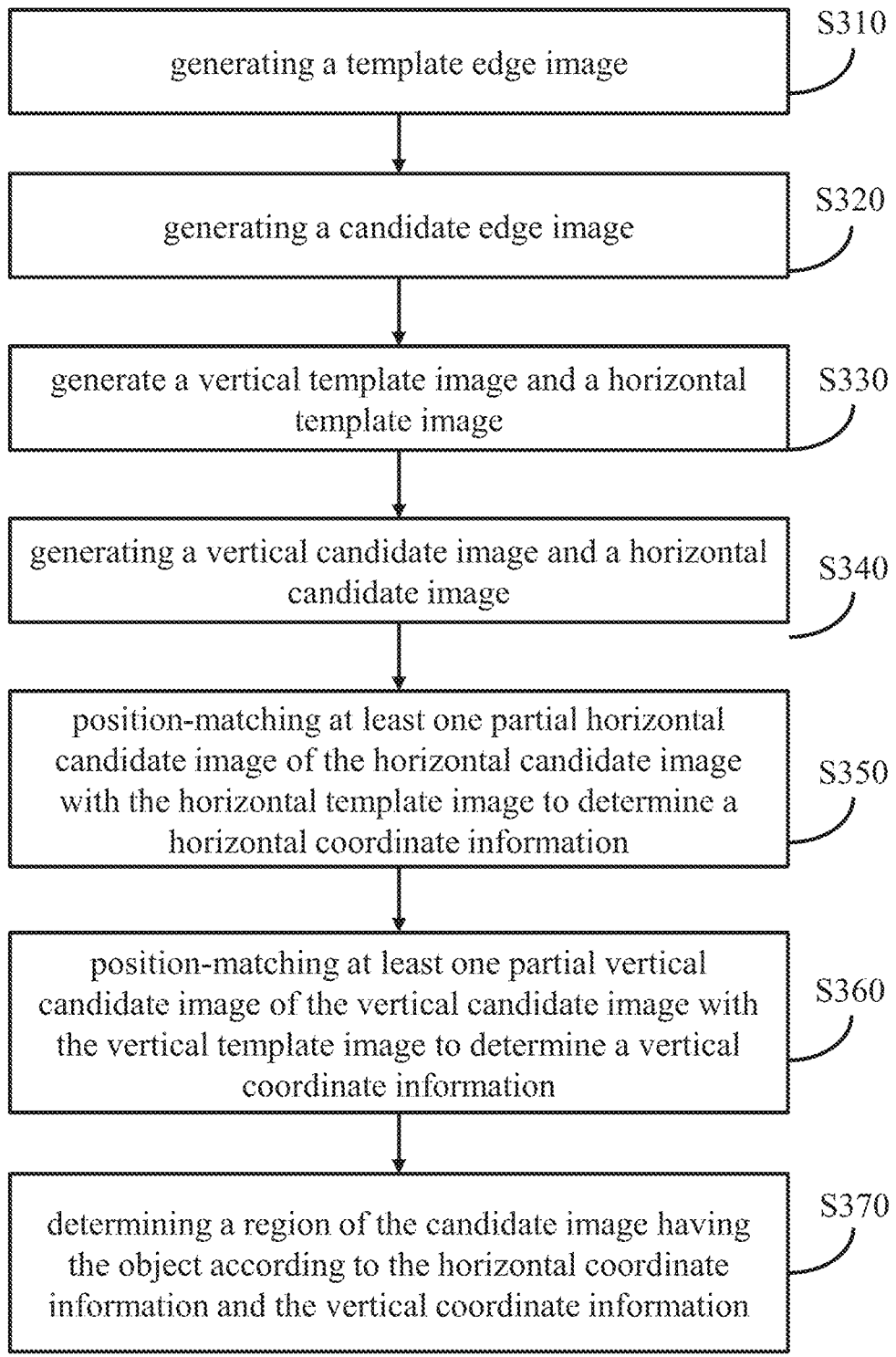
FIG. 3 illustrates a flow diagram of the method for comparing tracking object according to an embodiment of the present disclosure.

After obtaining the template image and the candidate image, the processor 110 stores the template image and the candidate image in the storage 120. The template image has the object to be tracked, while the tracking algorithm estimates that the candidate images may have the object to be tracked. Subsequently, the processor 110 determines whether the object to be tracked is successfully tracked in the candidate image (i.e., to determine whether the object to be tracked is indeed in the candidate image). Please also refer to FIG. 3, which is a flow diagram of the method for comparing tracking object performed by processor 110.

The processor 110 performs edge detection to the template image and the candidate image to generate a template edge image and a candidate edge image respectively (steps S310 and S320). It should be noted that the implementation of the edge detection is well-known to people having ordinary skill in the art and, therefore, will not be described herein. In some embodiments, the processor 110 may denoise the template image and the candidate image individually before performing edge detection to obtain the template image and the candidate image that are less affected by noise. In this way, template edge image and candidate edge image with better quality will be generated and, hence, the subsequent comparisons and determinations will be more correct.

For ease of understanding, please refer to the specific examples of FIG. 4A and FIG. 4B, which, however, are not intended to limit the scope of the present disclosure. In the present embodiments, the processor 110 performs edge detection to the template image Iref to generate a binarized template edge image Eref, and performs edge detection to the candidate image Id to generate a binarized candidate edge image Ed. In the template edge image Eref and the candidate edge image Ed, each square represents a pixel. Specifically, the "white" squares represent the edge(s) of the object and whose pixel values are represented by "1" and the "dark gray" squares represent non-edge and whose pixel values are represented by "0." It should be noted that the aforementioned pixel values representing edge(s) of the object and the pixel values representing non-edge are merely illustrative. The aforementioned exemplary pixel values shall not limit the scope of the present disclosure.

In addition, the processor 110 statistically calculates (e.g., sums up, averages) a plurality of pixel values of the template edge image in a horizontal direction and a vertical direction to respectively generate a vertical template image and a horizontal template image (step S330). Specifically, the processor 110 statistically calculates a plurality of pixel values for each row of the template edge image. Each row has a statistical value, and the statistical values of these rows form a vertical template image. Similarly, processor 110 statistically calculates a plurality of pixel values for each column of the template edge image. Each column has a statistical value, and the statistic values of these columns form a horizontal template image.

The specific case shown in FIG. 4A is detailed herein for ease of understanding, which, however, is not intended to limit the scope of the disclosure. The processor 110 statistically calculates a plurality of pixel values of the template edge image Eref in the horizontal direction D1. For instance, the processor 110 sums up a plurality of pixel values of each row of the template edge image Eref in the horizontal direction D1 to generate a vertical template image V1, i.e., $[0+0+0+0+0+0+0, \ 0+1+1+1+1+1+0, \ 0+1+0+0+0+1+0, \ 0+1+0+0+0+1+0, \ 0+1+0+0+0+1+0, \ 0+1+1+1+1+1+0, \ 0+0+0+0+0+0+0]^T = [0,5,2,2,2,5,0]^T$. The processor 110 sums up a plurality of pixel values of each column of the template edge image Eref in the vertical direction D2 to generate a horizontal template image H1, i.e., $[0+0+0+0+0+0+0, \ 0+1+1+1+1+1+0, \ 0+1+0+0+0+1+0, \ 0+1+0+0+0+1+0, \ 0+1+0+0+0+1+0, \ 0+1+1+1+1+1+0, \ 0+0+0+0+0+0+0] = [0,5,2,2,2,5,0]$. For another example, the processor 110 may average a plurality of pixel values of each row of the template edge image Eref in the horizontal direction D1 to generate the vertical template image V1, and average a plurality of pixel values of each column of the template edge image Eref in the vertical direction D2 to generate a horizontal template image H1.

It should be noted that the larger the value in the vertical template image V1 and the horizontal template image H1, the more edges the corresponding rows or columns have, and thus there are more amount of information of the object. Thereby, the processor 110 may define the position of the object to be tracked in the template image Iref through the values in the vertical template image V1 and the horizontal template image H1.

Similarly, the processor 110 statistically calculates a plurality of pixel values of the candidate edge image in a horizontal direction and a vertical direction to respectively generate a vertical candidate image and a horizontal candidate image (step S340). Specifically, the processor 110 statistically calculates a plurality of pixel values for each row of the candidate edge image. Each column has a statistical value, and the statistical values of these rows form a vertical candidate image. Similarly, processor 110 statistically calculates a plurality of pixel values for each column of candidate edge images. Each row has a statistical value, and the statistical values of these columns form a horizontal candidate image.

The specific case of FIG. 4B is detailed herein for ease of understanding, which, however, is not intended to limit the scope of the disclosure. The processor 110 statistically calculates a plurality of pixel values of the candidate edge image Ed in the horizontal direction D1. For instance, the processor 110 sums up a plurality of pixel values of each row of the candidate edge image Ed in the horizontal direction D1 to generate a vertical candidate image V2, i.e., [1+0+0+0+1+0+0, 1+0+0+0+1+0+0, 1+0+0+0+1+0+0, 1+1+1+1+1+0+0, 0+0+0+0+0+0+0, 0+0+0+0+0+0+0, 0+0+0+0+0+0+0]$^T$=[2,2,2,5,0,0,0]$^T$. The processor 110 sums up a plurality of pixel values of each column of the candidate edge image Ed in the vertical direction D2 to generate a horizontal candidate image H2, i.e., [1+1+1+1+0+0+0, 0+0+0+1+0+0+0, 0+0+0+1+0+0+0, 0+0+0+1+0+0+0, 1+1+1+1+0+0+0, 0+0+0+0+0+0+0, 0+0+0+0+0+0+0]=[4,1,1,1,4,0,0]. For another example, the processor 110 may, by the aforementioned method, average the plurality of pixel values of each row of the candidate edge image Ed in the horizontal direction D1 to generate the vertical candidate image V2, and average the plurality of pixel values of each column of the candidate edge image Ed in the vertical direction D2 to generate a horizontal candidate image H2.

It should be noted that the larger the value in the vertical template image V2 and the horizontal template image H2, the more edges the corresponding rows or columns have, thus having more amount of information of the object to be tracked (if the candidate image Id indeed contains the object to be tracked). Thereby, the processor 110 may define the position of the object to be tracked in the template image Iref through the values in the vertical candidate image V2 and the horizontal candidate image H2.

In the present disclosure, the processor 110 executes the step S310 and then executes the step S330. In addition, the processor 110 executes the step S320 and then executes the step S340. Note that the order of steps S320 and S330 is not limited in the present disclosure. Please refer to FIG. 3 again. In the subsequent steps S350-S360, the processor 110 further finds out the tracking object (if any) in the candidate image Id corresponds to which position of the object to be tracked in the template image Iref.

To be more specific, in the step S350, the processor 110 position-matches at least one partial horizontal candidate image of the horizontal candidate image and the horizontal template image to determine a horizontal coordinate information. In the present embodiment, each partial horizontal candidate image is at least half of the horizontal candidate image and preferably ¾ (i.e., three quarters) of or more of the horizontal candidate image. Additionally, the processor 110 individually calculates the matching degree of each partial horizontal candidate image against a plurality of positions in the horizontal template image, and selects the position with the highest matching degree as the horizontal coordinate information.

Figure 5A:
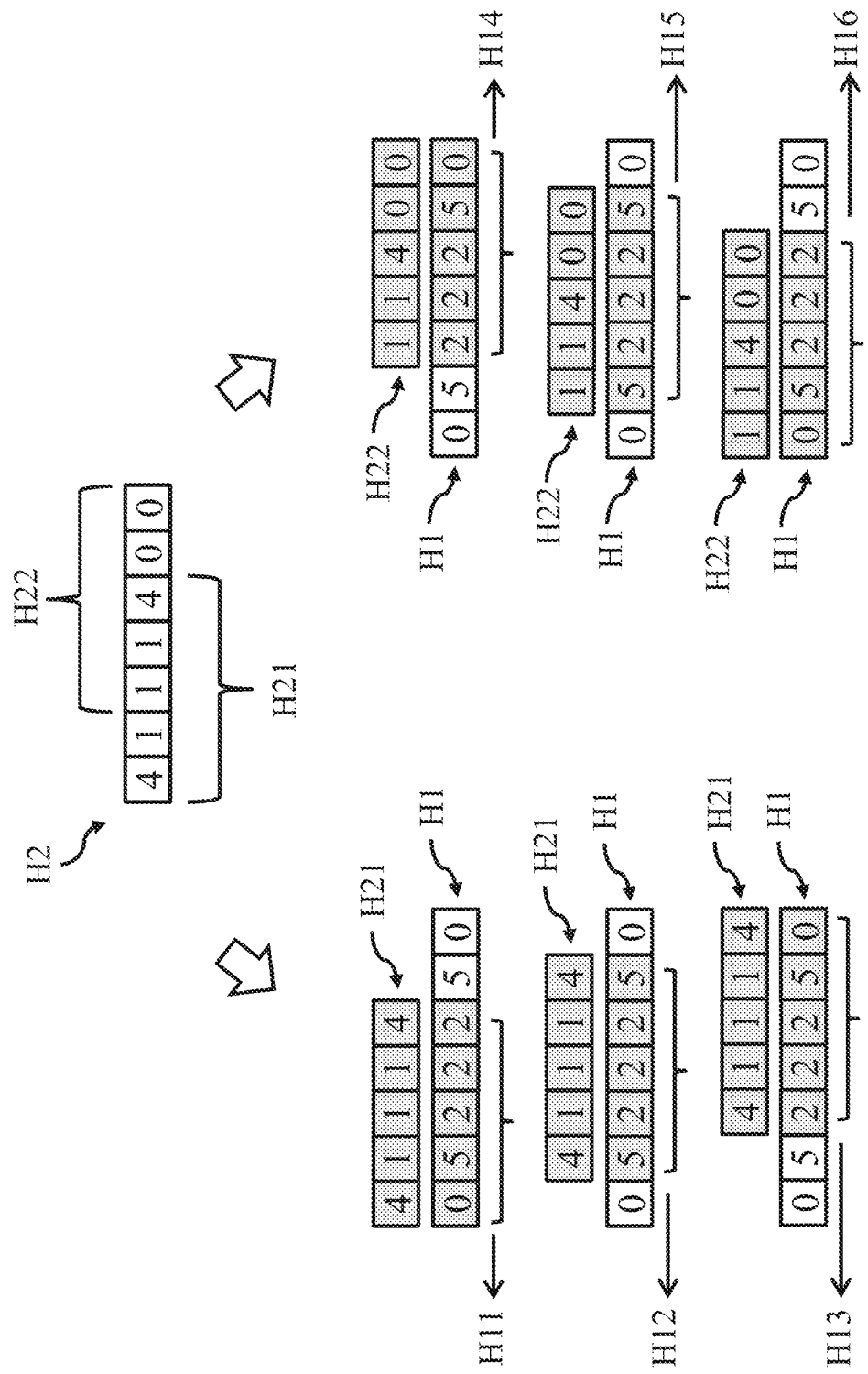
FIG. 5A illustrates a schematic view of position-matching the partial horizontal candidate image and the horizontal template image according to an embodiment of the present disclosure.

The specific example shown in FIGS. 4A-4B is continued with reference to FIG. 5A. In this specific example, the pixel values of the horizontal template image H1 are [0,5,2,2,2,5,0], and the pixel values of the horizontal candidate image H2 are [4,1,1,1,4,0,0]. The processor 110 determines partial horizontal candidate images H21 and H22 from the horizontal candidate image H2, which respectively cover five pixels of the horizontal candidate image H2 from the left (about 70% of the horizontal candidate image H2 from the left) and five pixels of the horizontal candidate image H2 from the right (about 70% of the horizontal candidate image H2 from the right). Then, the processor 110 calculates the matching degree of each of the partial horizontal candidate images H21 and H22 against a plurality of positions of the horizontal template image H1 individually.

In the specific example of FIG. 5A, the zeroth pixel, the first pixel, and the second pixel from the leftmost side of the horizontal template image H1 are the three positions H11, H12, and H13 that the partial horizontal candidate image H21 is going to be compared (i.e., the partial horizontal candidate image H21 is aligned with the left side of the horizontal template image H1, and then shifted toward the right by zero pixels, one pixel, and two pixels). The processor 110 individually aligns the leftmost pixels of the partial horizontal candidate image H21 with the three positions H11, H12, and H13 in the horizontal template image H1, and calculates the matching degree (e.g., cross-correlation value) according to the overlapping portion of the pixels (i.e., the gray portion). In addition, the zeroth pixel, the first pixel, and the second pixel from the rightmost side of the horizontal template image H1 are the three positions H14, H15, and H16 that the partial horizontal candidate image H22 is going to be compared (i.e., the partial horizontal candidate image H22 is aligned with the right side of the horizontal template image H1, and then shifted toward the left by zero pixels, one pixel, and two pixels). The processor 110 individually aligns the rightmost pixels of the partial horizontal candidate image H22 with the three positions H14, H15, and H16 in the horizontal template image H1, and calculates the matching degree (e.g., cross-correlation value) according to the overlapping portion (i.e., the gray portion) of the pixels. The matching degree of the partial horizontal candidate image H21 at the different positions H11, H12, and H13 and the matching degree of the partial horizontal candidate image H22 at the different positions H14, H15, and H16 are shown in the following Table 1.

TABLE 1

| Position | Partial Horizontal Candidate Image | Matching Degree |
| --- | --- | --- |
| H11 | H21 = [4, 1, 1, 1, 4] | 0*4 + 5*1 + 2*1 + 2*1 + 2*4 = 17 |
| H12 | | 5*4 + 2*1 + 2*1 + 2*1 + 5*4 = 46 |
| H13 | | 2*4 + 2*1 + 2*1 + 5*1 + 0*4 = 17 |
| H14 | H22 = [1, 1, 4, 0, 0] | 2*1 + 2*1 + 2*4 + 5*0 + 0*0 = 12 |
| H15 | | 5*1 + 2*1 + 2*4 + 2*0 + 5*0 = 15 |
| H16 | | 0*1 + 5*1 + 2*4 + 2*0 + 2*0 = 13 |

The processor 110 selects the position having the highest matching degree from these positions H11-H16 as the horizontal coordinate information. According to the Table 1, the partial horizontal candidate image H21 has the highest matching degree (the matching degree is 46) at the position H12 (i.e., the position derived by aligning the partial horizontal candidate image H21 with the left side of the horizontal template image H1 and then moving toward the right by one pixel), so the processor 110 selects the position H12 as the horizontal coordinate information. This selection means that the processor 110 considers that the horizontal position of the tracking object in the candidate image Id corresponds to the position H12 of the horizontal template image H1 in the template image Iref (i.e., the position derived by aligning the candidate image Id with the template image Iref and then moving toward the right by one pixel). In other embodiments, the processor 110 may use other matching algorithms to calculate the matching degree of each of the partial horizontal candidate images H21-H22 at the plurality of positions H11-H16 of the horizontal template image H1, which is not limited in the present disclosure.

Please refer to FIG. 3 again. In step S360, the processor 110 position-matches the at least one partial vertical candidate image of the vertical candidate image and the vertical template image to determine a vertical coordinate information. In the present embodiment, each of the partial vertical candidate images is at least half of the vertical candidate image and preferably ¾ (i.e., three quarters) of or more of the vertical candidate image. Additionally, the processor 110 individually calculates a matching degree of each of the partial vertical candidate images against a plurality of positions of the vertical template image, and selects the position with the highest matching degree as the vertical coordinate information.

Figure 5B:
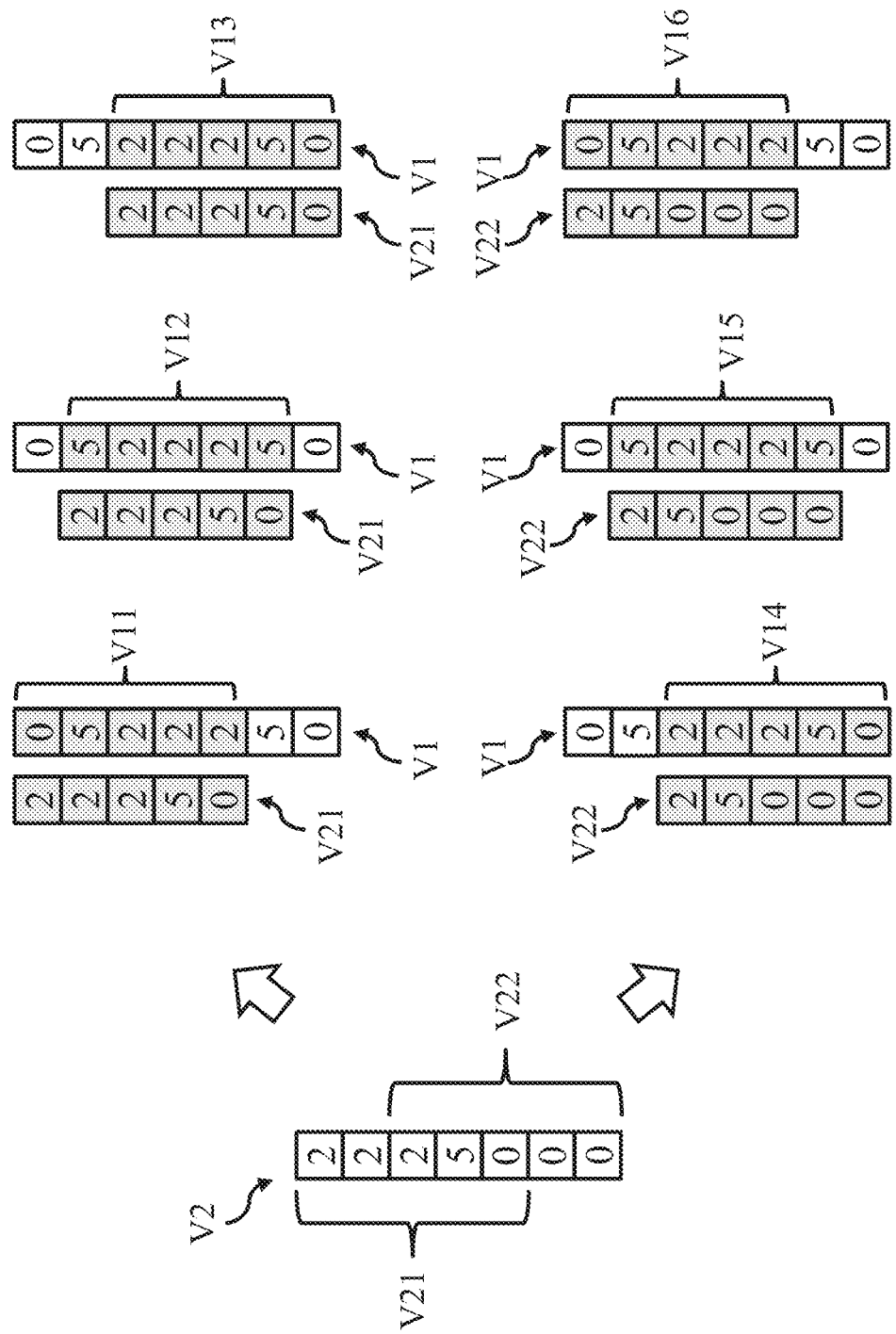
FIG. 5B illustrates a schematic view of position-matching the partial vertical candidate image and the vertical template image according to an embodiment of the present disclosure.

The specific example shown in FIGS. 4A-4B is continued with reference to FIG. 5B. In this specific example, the pixel values of the vertical template image V1 are $[0,5,2,2,2,5,0]^T$, and the pixel values of the vertical candidate image V2 are $[2,2,2,5,0,0,0]^T$. The processor 110 determines partial vertical candidate images V21 and V22 from the vertical candidate image V2, which respectively cover the upper five pixels (about 70% of the upper vertical candidate image V2) and the lower five pixels (about 70% of the lower vertical candidate image V2) of the vertical candidate image V2. Then, the processor 110 calculates the matching degree of each of the partial vertical candidate images V21 and V22 against a plurality of positions of the vertical template image V1 individually.

In the specific example of FIG. 5B, the zeroth pixel, the first pixel, and the second pixel from the top side of the vertical template image V1 are the three positions V11, V12, and V13 that the partial vertical candidate image V21 is going to be compared (i.e., the partial vertical candidate image V21 is aligned with the up side of the vertical template image V1 and then shifted downward by zero pixels, one pixel, and two pixels). The processor 110 individually aligns the uppermost pixel of the partial vertical candidate image V21 with the three positions V11, V12, and V13 of the vertical template image V1, and calculates the matching degree (e.g., cross-correlation value) according to the overlapping portion of the pixels (i.e., the gray portion). In addition, the zeroth pixel, the first pixel, and the second pixel from the bottom side of the vertical template image V1 are the three positions V14, V15, and V16 that the partial vertical candidate image V22 is going to be compared (i.e., the partial vertical candidate image V22 is aligned with the bottom side of the vertical template image V1 and then shifted upward by zero pixels, one pixel, and two pixels). The processor 110 individually aligns the bottom pixels of the partial vertical candidate image V22 with the three positions V14, V15, and V16 in the vertical template image V1, and calculates the matching degree (e.g., cross-correlation value) according to the overlapping portion (i.e., the gray portion) of the pixels. The matching degree of the partial vertical candidate image V21 at the different positions V11, V12, and V13 and the matching degree of the partial vertical candidate image V22 at the different positions V14, V15, and V16 are shown in the following Table 2.

TABLE 2

| Position | Partial Vertical Candidate Image | Matching Degree |
|---|---|---|
| V11 | V21 = [2, 2, 2, 5, 0] | 0*2 + 5*2 + 2*2 + 2*5 + 2*0 = 24 |
| V12 | | 5*2 + 2*2 + 2*2 + 2*5 + 5*0 = 28 |
| V13 | | 2*2 + 2*2 + 2*2 + 5*5 + 0*0 = 37 |
| V14 | V22 = [2, 5, 0, 0, 0] | 2*2 + 2*5 + 2*0 + 5*0 + 0*0 = 14 |
| V15 | | 5*2 + 2*5 + 2*0 + 2*0 + 5*0 = 20 |
| V16 | | 0*2 + 5*5 + 2*0 + 2*0 + 2*0 = 25 |

The processor 110 selects the position having the highest matching degree from these positions V11-V16 as the vertical coordinate information. According to the Table 2, the partial vertical candidate image V21 has the highest matching degree (the matching degree is 37) at the position V13 (i.e., the position derived by aligning the partial vertical candidate image V21 with the top side of the vertical template image V1 and then moving downward by one pixel), so the processor 110 selects the position V13 as the vertical coordinate information. This selection means that the processor 110 considers that the vertical position of the tracking object in the candidate image Id corresponds to the position V13 of the vertical template image V1 in the template image Iref (i.e., the position derived by aligning the candidate image Id with the template image Iref and then moving downward by one pixel). In other embodiments, the processor 110 may use other matching algorithms to calculate the matching degree of each of the partial vertical candidate images V21-V22 at the plurality of positions V11-V16 of the vertical template image V1, which is not limited in the present disclosure.

In some embodiments, after obtaining the horizontal coordinate information and the vertical coordinate information (i.e., the steps S350-S360), the processor 110 determines the region of the candidate image that has the object according to the horizontal coordinate information and the vertical coordinate information (step S370). Continuing with the specific example of FIGS. 4A, 4B, 5A, and 5B, the processor 110 determines that the partial horizontal candidate image H21 has the highest matching degree at the position H12, and the partial vertical candidate image V21 has the highest matching degree at the position V13. Since the partial horizontal candidate image H21 corresponds to the left five pixels of the candidate image Id and the partial vertical candidate image V21 corresponds to the upper five pixels of the candidate image Id, the processor 110 determines that the upper left 5*5 pixels in the candidate image Id is the region having the object.

Figure 6A:
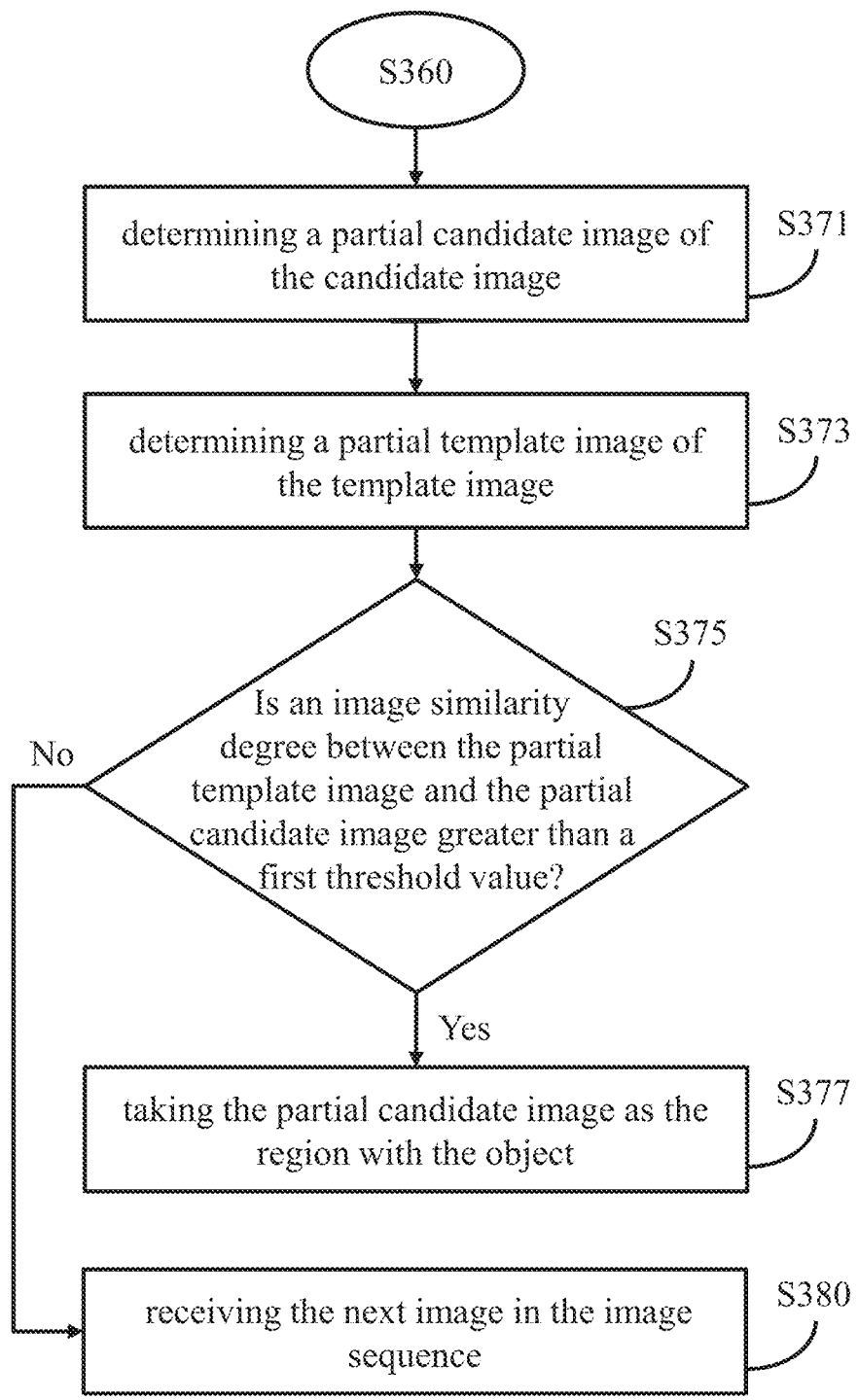
FIG. 6A illustrates a flow diagram of determining the image similarity degree between the partial template image and the partial candidate image according to an embodiment of the present disclosure.

In some embodiments, after obtaining the horizontal coordinate information and the vertical coordinate information (the steps S350-S360), the flow diagram of FIG. 6A is executed. Specifically, the processor 110 determines a partial candidate image of the candidate image according to one of the at least one partial horizontal candidate images and one of the at least one partial vertical candidate image (step S371). In addition, the processor 110 determines a partial template image of the template image based on the horizontal coordinate information, the vertical coordinate information, and a cropping size (step S373). The size of the partial candidate image is the same as that of the partial template image, therefore the subsequent process determines whether the object to be tracked in the template image is successfully tracked under the same size (i.e., the size of the partial candidate image is the same as that of the partial template image).

For ease of understanding, the specific examples of FIGS. 4A, 4B, 5A, and 5B are illustrated. The processor 110 determines that the partial horizontal candidate image H21 has the highest matching degree at the position H12 (as shown in Table 1 and FIG. 5A) and the partial vertical candidate image V21 has the highest matching degree at the position V13 (as shown in Table 2 and FIG. 5B). Since the partial horizontal candidate image H21 of FIG. 5A corresponds to the left five pixels of the horizontal candidate image H2 of FIG. 4B and the partial vertical candidate image V21 of FIG. 5B corresponds to the upper five pixels of the vertical candidate image V2 of FIG. 4B, the processor 110 determines that the upper left 5*5 pixels in the candidate image Id of FIG. 4B form the partial candidate image (i.e., the partial candidate image corresponds to the pixels P1-P25 in the candidate edge image Ed of FIG. 4B).

In addition, the processor 110 determines a cropping size based on the size of the partial horizontal candidate image H21 and the size of the partial vertical candidate image V21. Taking FIGS. 5A and 5B as an example, the size of the partial horizontal candidate image H21 is 1*5 pixels and the size of the partial vertical candidate image V21 is 5*1 pixels and, hence, the cropping size is 5*5 pixels. Since the processor 110 selects the position H12 as the horizontal coordinate information (i.e., moving one pixel toward the right after aligning the left side) and selects the position V13 as the vertical coordinate information (i.e., moving downward by two pixels after aligning the top side), the processor 110 aligns the upper left corner of a cropping frame (whose size is the aforementioned cropping size) with the upper left pixel (i.e., corresponding to the pixel A0 of the candidate template image Eref of FIG. 4A) of the template image Iref of FIG. 4A. Next, the processor 110 moves the cropping frame toward the right by one pixel and moves the cropping frame downward by two pixels, and then crops the partial template image (i.e., the partial template image corresponds to the pixels A1-A25 in the candidate template image Eref of FIG. 4A).

After obtaining the partial template image and the partial candidate image (i.e. the steps S371-S373), the processor 110 further determines whether an image similarity degree between the partial template image and the partial candidate image is greater than a first threshold value (step S375). It should be noted that the image similarity degree between the partial template image and the partial candidate image may be obtained by pHash algorithm, Sum of Absolute Difference (SAD) algorithm, Cosine Distance algorithm, or other algorithms, which is not limited by the present disclosure. If the image similarity degree between the partial template image and the partial candidate image is not greater than the first threshold value, it represents that the partial candidate image is different from the partial template image. The processor 110 determines that there is no object to be tracked in the partial candidate image. When this happens, the processor 110 will receive the next image of the image sequence Seq (step S380) to analyze the next image. If the image similarity degree between the partial template image and the partial candidate image is greater than the first threshold value, it represents that the partial candidate image has the object to be tracked (i.e., the object to be tracked in the template image is successfully tracked). At this time, the processor 110 will take the partial candidate image as the region with the object (step S377). Furthermore, the processor 110 may move the tracking frame to the region with the object in the candidate image to update the condition of the tracking object.

Accordingly, after determining the image similarity degree between the partial template image and the partial candidate image, the processor 110 determines whether the object to be tracked in the template image is successfully tracked in the candidate image according to the image similarity degree.

Figure 6B:
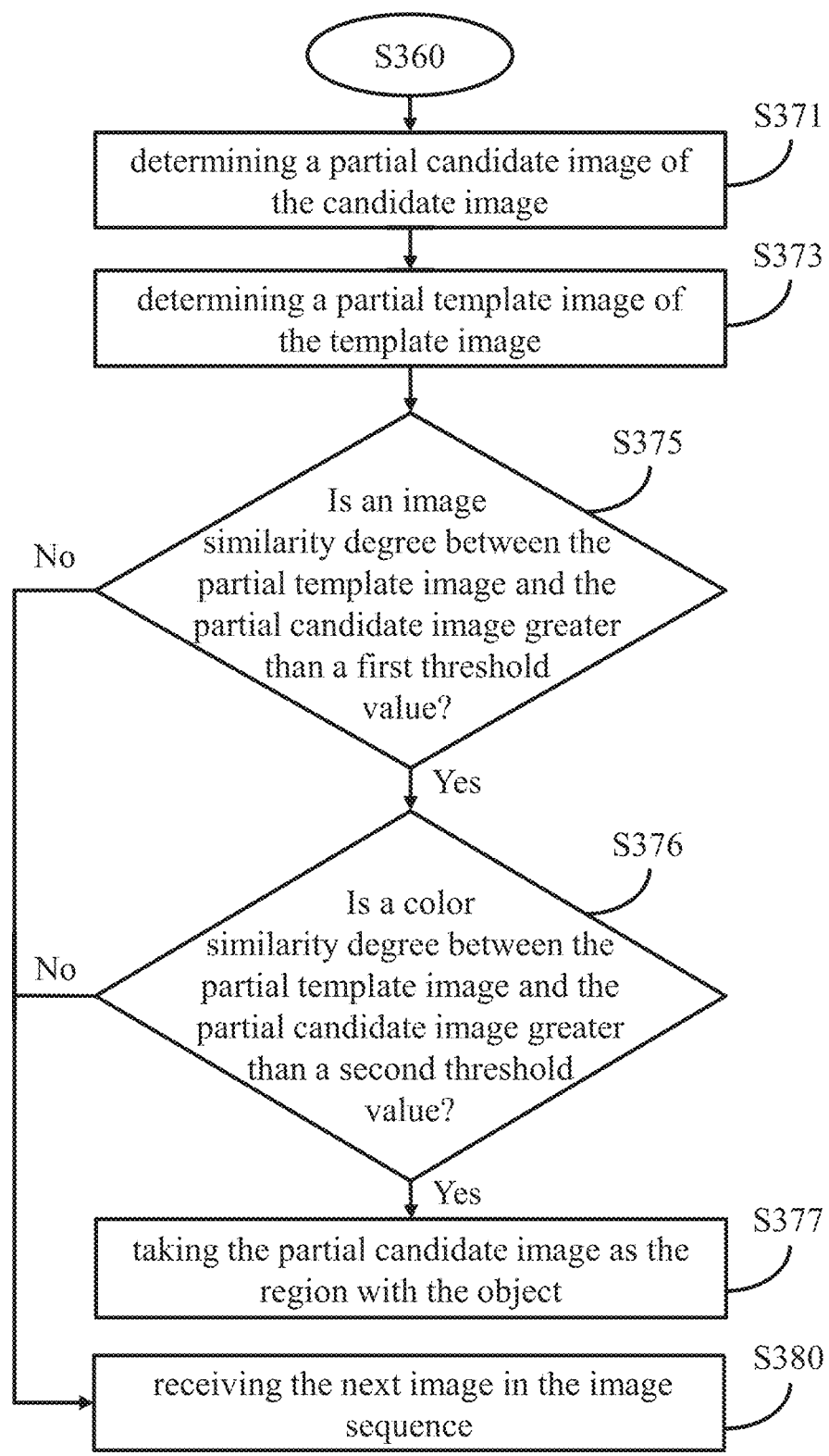
FIG. 6B illustrates a flow diagram of determining the color similarity degree between the partial template image and the partial candidate image according to an embodiment of the present disclosure.

In other embodiments, after obtaining the horizontal coordinate information and the vertical coordinate information (i.e., the steps S350-S360), the processor 110 executes the process shown in FIG. 6B. In these embodiments, the processor 110 executes steps S371 and S373 and then executes step S375. In step S375, if the image similarity degree between the partial template image and the partial candidate image is greater than the first threshold value, the processor 110 further determines whether a color similarity degree between the partial template image and the partial candidate image is greater than a second threshold value (step S376). Further, the processor 110 calculates a luminance similarity degree, a first chrominance similarity degree, and a second chrominance similarity degree between the partial template image and the partial candidate image, and then calculates the color similarity degree according to the luminance similarity degree, the first chrominance similarity degree, and the second chrominance similarity degree. For example, the processor 110 may individually convert the partial template image and the partial candidate image from the RGB color mode to the YUV color mode, wherein Y data of the YUV color mode represent luminance, U data of the YUV color mode represent a first kind of chrominance, and V data of the YUV color mode represent a second kind of chrominance Next, the processor 110 generates a luminance histogram according to the Y data, a first chrominance histogram according to the U data, and a second chrominance histogram according to the V data for the partial template image and the partial candidate image, individually. The processor 110 further generates the luminance similarity degree by comparing the luminance histogram of the partial template image with that of the partial candidate image, generates the first chrominance similarity degree by comparing the first chrominance histogram of the partial template image with that of the partial candidate image, and generates the second chrominance similarity degree by comparing the second chrominance histogram of the partial template image with that of the partial candidate image.

If the color similarity degree between the partial template image and the partial candidate image is less than or equal to the second threshold value, it represents that the partial candidate image is different from the partial template image. The processor 110 determines that there is no object to be tracked in the partial candidate image. When this happens, the processor 110 will receive the next image in the image sequence Seq (step S380) to analyze the next image. If the color similarity degree between the partial template image and the partial candidate image is greater than the second threshold value, it represents that the partial candidate image has the object to be tracked (i.e., the object to be tracked in the template image is successfully tracked). When this happens, the processor 110 will take the partial candidate image as the region with the object (step S377). Furthermore, the processor 110 may move the tracking frame to the region with the object in the candidate image to update the condition of the tracking object.

Accordingly, after calculating the image similarity degree between the partial template image and the partial candidate image, the processor 110 further calculates the color similarity degree between the partial template image and the partial candidate image so as to determine whether the object to be tracked in the template image is successfully tracked in the candidate image according to the image similarity degree and the color similarity degree.

In summary, a method and an electronic apparatus for comparing tracking object are disclosed by the present disclosure, which adapt a method using the edge image of the template image and that of the candidate image (i.e. the template edge image and the candidate edge image), so as to reduce the amount of data in the edge image, and to determine whether the object to be tracked in the template image is successfully tracked based on the edge image whose amount of data has been reduced (i.e., the vertical template image, the horizontal template image, the vertical candidate image, and the horizontal candidate image). Therefore, the method and the electronic apparatus of the present disclosure for comparing tracking object can quickly track the object while ensuring the tracking accuracy. The above disclosure is related to the detailed technical contents and inventive features thereof. People of ordinary skill in the art may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

What is claimed is:

1. A method for comparing tracking object, being suitable for an electronic apparatus, the method comprising:
   (A) applying an edge detection to a template image to generate a template edge image, wherein the template image has an object;
   (B) applying the edge detection to a candidate image to generate a candidate edge image;
   (C) calculating a plurality of pixel values of the template edge image in a horizontal direction and in a vertical direction to generate a vertical template image and a horizontal template image respectively;
   (D) calculating a plurality of pixel values of the candidate edge image in the horizontal direction and in the vertical direction to generate a vertical candidate image and a horizontal candidate image respectively;
   (E) position-matching at least one partial horizontal candidate image of the horizontal candidate image with the horizontal template image to determine a horizontal coordinate information;
   (F) position-matching at least one partial vertical candidate image of the vertical candidate image with the vertical template image to determine a vertical coordinate information; and
   (G) determining a region of the candidate image having the object according to the horizontal coordinate information and the vertical coordinate information.

2. The method of claim 1, further comprising:
   determining a partial candidate image of the candidate image according to one of the at least one partial horizontal candidate image and one of the at least one partial vertical candidate image;
   determining a partial template image of the template image based on the horizontal coordinate information, the vertical coordinate information, and a cropping size; and
   determining that an image similarity degree between the partial template image and the partial candidate image is greater than a first threshold value;
   wherein the step (G) is executed in response to the determination of the image similarity degree being greater than the first threshold value, and the step (G) determines that the partial candidate image is the region having the object.

3. The method of claim 2, wherein the cropping size is determined based on a size of one of the at least one partial horizontal candidate image and a size of one of the at least one partial vertical candidate image.

4. The method of claim 1, further comprising:
   determining a partial candidate image of the candidate image according to one of the at least one partial horizontal candidate image and one of the at least one partial vertical candidate image;
   determining a partial template image of the template image based on the horizontal coordinate information, the vertical coordinate information, and a cropping size;
   determining that an image similarity degree between the partial template image and the partial candidate image is greater than a first threshold value; and
   determining that a color similarity degree between the partial template image and the partial candidate image is greater than a second threshold value after determining that the image similarity degree is greater than the first threshold value;
   wherein the step (G) is executed in response to the determination of the color similarity degree being greater than the second threshold value, and the step (G) determines that the partial candidate image is the region having the object.

5. The method of claim 4, further comprising:
   calculating a luminance similarity degree, a first chrominance similarity degree, and a second chrominance similarity degree between the partial template image and the partial candidate image; and
   calculating the color similarity degree according to the luminance similarity degree, the first chrominance similarity degree, and the second chrominance similarity degree.

6. The method of claim 1, further comprising:
   cropping the template image from a first image of an image sequence according to a tracking frame;
   estimating a relative position of the object in a second image of the image sequence according to the template image and a tracking algorithm; and
   cropping the candidate image from the second image according to the relative position.

7. The method of claim 6, further comprising:
   receiving a signal, wherein the signal comprises a position of the tracking frame in the first image, and the tracking frame corresponds to the object to be tracked.

8. The method of claim 1, wherein the step (E) comprises:
   calculating a matching degree of the at least one partial horizontal candidate image against a plurality of positions of the horizontal template image individually; and
   selecting the position with the highest matching degree as the horizontal coordinate information.

9. The method of claim 1, wherein the step (F) comprises:
   calculating a matching degree of the at least one partial vertical candidate image against a plurality of positions of the vertical template image individually; and
   selecting the position with the highest matching degree as the vertical coordinate information.

10. The method of claim 1, further comprising:
    denoising the template image before executing the step (A); and
    denoising the candidate image before executing the step (B).

11. An electronic apparatus for comparing tracking object, comprising:
  a storage storing a template image and a candidate image, wherein the template image has an object; and
  a processor coupled to the storage and executing the following steps:
    (A) applying an edge detection to the template image to generate a template edge image;
    (B) applying the edge detection to the candidate image to generate a candidate edge image;
    (C) calculating a plurality of pixel values of the template edge image in a horizontal direction and in a vertical direction to generate a vertical template image and a horizontal template image respectively;
    (D) calculating a plurality of pixel values of the candidate edge image in the horizontal direction and in the vertical direction to generate a vertical candidate image and a horizontal candidate image respectively;
    (E) position-matching at least one partial horizontal candidate image of the horizontal candidate image with the horizontal template image to determine a horizontal coordinate information;
    (F) position-matching at least one partial vertical candidate image of the vertical candidate image with the vertical template image to determine a vertical coordinate information; and
    (G) determining a region of the candidate image having the object according to the horizontal coordinate information and the vertical coordinate information.

12. The electronic apparatus of claim 11, wherein the processor determines a partial candidate image of the candidate image according to one of the at least one partial horizontal candidate image and one of the at least one partial vertical candidate image, determines a partial template image of the template image based on the horizontal coordinate information, the vertical coordinate information, and a cropping size, and determines that an image similarity degree between the partial template image and the partial candidate image is greater than a first threshold value, wherein the processor executes the step (G) in response to the determination of the image similarity degree being greater than the first threshold value, and the step (G) determines that the partial candidate image is the region having the object.

13. The electronic apparatus of claim 12, wherein the processor determines the cropping size based on a size of one of the at least one partial horizontal candidate image and a size of one of the at least one partial vertical candidate image.

14. The electronic apparatus of claim 11, wherein the processor determines a partial candidate image of the candidate image according to one of the at least one partial horizontal candidate image and one of the at least one partial vertical candidate image, determines a partial template image of the template image based on the horizontal coordinate information, the vertical coordinate information, and a cropping size, and determines that an image similarity degree between the partial template image and the partial candidate image is greater than a first threshold value;
  wherein the processor determines that a color similarity degree between the partial template image and the partial candidate image is greater than a second threshold value after determining that the image similarity degree is greater than the first threshold value;
  wherein the processor executes the step (G) in response to the determination of the color similarity degree being greater than the second threshold value, and the step (G) determines that the partial candidate image is the region having the object.

15. The electronic apparatus of claim 14, wherein the processor calculates a luminance similarity degree, a first chrominance similarity degree, and a second chrominance similarity degree between the partial template image and the partial candidate image, and calculates the color similarity degree according to the luminance similarity degree, the first chrominance similarity degree, and the second chrominance similarity degree.

16. The electronic apparatus of claim 11, wherein the processor crops the template image from a first image of an image sequence according to a tracking frame, estimates a relative position of the object in a second image of the image sequence according to the template image and a tracking algorithm, and crops the candidate image from the second image according to the relative position.

17. The electronic apparatus of claim 16, wherein the processor receives a signal, the signal comprises a position of the tracking frame in the first image, and the tracking frame corresponds to the object to be tracked.

18. The electronic apparatus of claim 11, wherein, when executing the step (E), the processor calculates a matching degree of the at least one partial horizontal candidate image against a plurality of positions of the horizontal template image individually, and selects the position with the highest matching degree as the horizontal coordinate information.

19. The electronic apparatus of claim 11, wherein, when executing the step (F), the processor calculates a matching degree of the at least one partial vertical candidate image against a plurality of positions of the vertical template image individually, and selects the position with the highest matching degree as the vertical coordinate information.

20. The electronic apparatus of claim 11, wherein the processor denoises the template image before executing the step (A), and denoises the candidate image before executing the step (B).

* * * * *